May 7, 1946.  J. E. KEISTER  2,399,930
ENERGY DISSIPATOR
Filed May 16, 1942  2 Sheets-Sheet 1

Inventor:
James E. Keister,
by Harry E. Dunham
His Attorney.

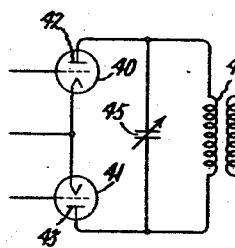
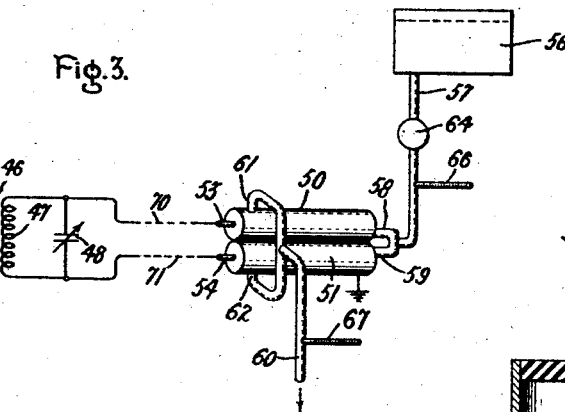
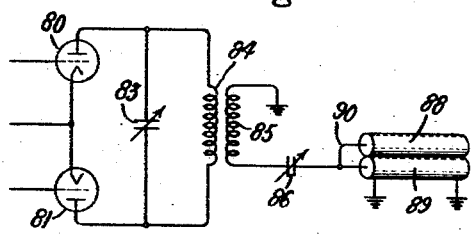
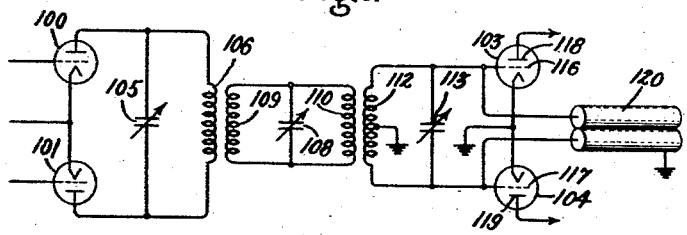
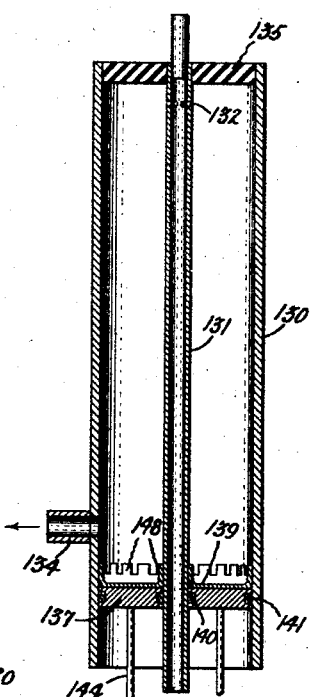

Patented May 7, 1946

2,399,930

UNITED STATES PATENT OFFICE 2,399,930

ENERGY DISSIPATOR

James E. Keister, Scotia, N. Y., assignor to General Electric Company, a corporation of New York Application May 16, 1942, Serial No. 443,215

9 Claims. (Cl. 178—44)

This invention relates to an energy dissipator especially adapted for use in testing high frequency radio transmitters and in related applications.

One of the problems involved in the factory testing of a radio transmitter is that of providing a means of simulating the radiating antenna into which the transmitter is designed to operate. This calls for a device which will absorb the radio frequency energy in such a way that the amount being absorbed is accurately measurable. In addition, the device simulating the antenna must present to the transmitter the same effective impedance as does the actual antenna.

In many cases it has proven possible to use a water-cooled resistance of conventional type as a dissipating means. However, in connection with high frequency transmitters such as transmitters operating at a frequency on the order of 20 megacycles, or higher, simple resistive loads present several difficulties. In the first place, it is practically impossible to connect the dissipator to the transmitter in such a fashion that no standing waves are present, which circumstance leads to frequent arcing between the various high voltage components of the system. Moreover, certain types of resistance load such as water-box loads tend to be unstable in operation, which makes it difficult to interpret the test results obtained. Other conventional loading devices are not purely resistive at high frequencies.

It is an object of the present invention to provide an improved form of energy-dissipating means which is especially adapted for use in the high frequency range and which is highly stable and reliable in operation.

Briefly, the aforementioned object is accomplished by the use of a resonant transmission line section which is adapted to have a liquid of high dielectric constant and suitable resistivity circulated between its conductors and which is constructed to present a substantially pure resistance load to the energy source to which it is to be connected.

Figure 1:
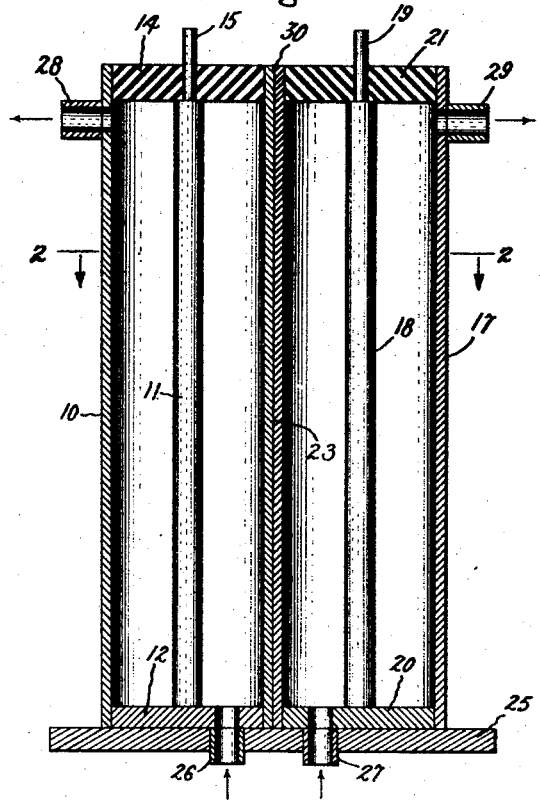
Figure 2:
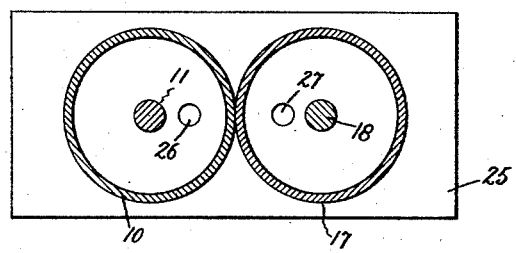

The features of the invention which I desire to protect herein are pointed out with particularity in the appended claims. The invention itself, together with further objects and advantages thereof, may best be understood by reference to the following description taken in connection with the drawings in which Fig. 1 is a vertical section of a dissipator suitably embodying the invention; Fig. 2 is a transverse section taken on line 2—2 of Fig. 1; Figs. 3, 4, and 5 are schematic circuit diagrams illustrating the application of the invention; and Fig. 6 represents a modification of the invention.

The dissipator shown in Fig. 1 comprises a pair of similar structures, each constituting a resonant transmission line section. As will be explained more fully at a later point, juxtaposition of the two structures in the manner shown makes it readily possible to connect the two transmission line sections either in series or in parallel as required by the application at hand and thus increases the adaptability of the dissipator as a whole.

The left-hand one of the illustrated transmission line sections comprises an outer tubular conductor 10, suitably consisting of copper or brass, which has arranged within it a solid cylindrical conductor 11, this conductor being preferably, although not necessarily, concentric with the conductor 10. At their lower extremities the conductors 10 and 11 are directly conductively connected by means of a metal (e. g. brass) plug 12 extending between them. The upper extremity of the conductor 10 is closed by an insulating plug 14 which fits snugly over an extended part 15 of the conductor 11, the part 15 being adapted to serve as a terminal for the conductor referred to. By the use of plugs 12 and 14, the space within the conductor 10 and between that conductor and conductor 11 is substantially completely enclosed and water-tight.

The right-hand transmission line section is identical with that described above and includes the combination of an outer conductor 17, an inner conductor 18, a terminal 19, a metal plug 20 and an insulating plug 21. The tubular conductor 17 is in direct electrical contact with the conductor 10 along the line 23, and the two conductors may be soldered or brazed together along this line. Both the transmission line sections are supported on a common base 25.

As has been previously indicated, it is the intended function of the construction of Fig. 1 to serve as an energy-dissipating means. For this use, it is desirable that each of the transmission line sections be adapted to simulate a pure resistance load at the chosen operating frequency and be further capable of dissipating a relatively large amount of power at this frequency. It is found that these results may be obtained in a conveniently usable construction by appropriately choosing the dimensions of the inner and outer conductors of the dissipator sections and by circulating a liquid of relatively low resistivity (on the order of a few thousand ohm centimeters) and relatively high dielectric constant between the conductors. For permitting circulation of the liquid selected the two dissipator sections are respectively provided with inlet ducts 26 and 27 and with outlet ducts 28 and 29.

The liquid dielectric to be circulated between the conductors may be of various kinds, including particularly dielectric oils such as transil oil modified by the addition of enough graphite to impart reasonable conductivity, but it is believed preferable under most circumstances to employ water. The latter liquid has the virtue of ready availability and is further characterized by an extremely high dielectric constant, this latter consideration being important for reasons which will appear hereinafter. The resistivity of ordinary tap water is about 3000 ohm centimeters at 17° C., which is a favorable value from the standpoint of producing losses (i. e. energy dissipation) of significant magnitude.

The physical length required to give each of the dissipator sections an effective electrical length of a quarter wave at the desired operating frequency is a function of the dielectric constant of the circulating medium employed between the inner and outer conductors. This derives from the fact that the frequency $f$ of a propagated magnetic wave is defined by the following equation:

$$f = \frac{V}{\lambda} \quad (1)$$

where $\lambda$ is the wave length in the particular propagating medium and $V$ is the velocity of propagation in the medium. $V$ is determined by the relationship $$V = \frac{3 \times 10^{10}}{\sqrt{e}} \quad (2)$$

in which $e$ is the dielectric constant of the propagating medium.

The dielectric constant of water is about 80; hence the velocity of propagation in water is $$V = \frac{3 \times 10^{10}}{\sqrt{80}} = 3.36 \times 10^9 \text{ centimeters per sec.} \quad (3)$$

and $$\frac{\lambda}{4} \text{ (in centimeters)} = \frac{3,360}{4f \text{ (in megacycles)}} = \frac{840}{f} \quad (4)$$

From Equation 4 one may determine, for example, that a quarter wave dissipator containing water as a dielectric and adapted for operation at a fundamental frequency of 26 megacycles should be about 32.3 centimeters or 12.7 inches in length. At this length the dissipator operates in resonance (for the frequency specified) and presents an impedance which is essentially purely resistive.

In determining the proper diameters for the conductors 10, 11 and 17, 18, it is expedient first to decide upon the exact resistance which it is desired to have the energy-dissipating structure present to the apparatus for which it is to provide a load. By appropriate manipulation of the standard transmission line equations relative to concentric conductor arrangements and assuming the use of water as a dielectric medium, it may be shown that the dimensions of a quarter wave concentric conductor transmission line section required to give a particular resistance $R_s$ can be determined by the following approximate relationship:

$$R_s \cong 8.73 \times 10^{-4} Rf \log_{10} \frac{b}{a} \quad (5)$$

where R is the resistivity of the water employed, $f$ is the operating frequency in megacycles per second, and $$\frac{b}{a}$$

is the ratio of the diameters of the outer and inner conductors of the concentric line.

For operation at frequencies which are odd multiples of the fundamental frequency $f$ (i. e. in using the line as a multiple quarter wave section), we have $$R_s \cong \frac{8.73 \times 10^{-4} Rf \log_{10} \frac{b}{a}}{n} \quad (6)$$

where $n$ is the order of the multiple in question. For even multiples of the fundamental frequency the resistance tends to become very low and is expressible as follows:

$$R_s \cong 15.5 \times 1.71 \times 10^4 \frac{n}{Rf} \quad (7)$$

In general, the highest resistance for a given frequency will be attained by making that frequency the lowest frequency at which the dissipator will operate (i. e. by using a transmission line section whose effective length is that of a single quarter wave at the frequency in question).

Assuming, by way of example, that it is desired to provide an input resistance of 50 ohms with the most compact construction possible (that is, with a line having an electrical length of one quarter wave), it can be shown from Equation 5 that the individual dimensions of the outer and inner conductors of the line may suitably be 2.5 inches (inside dimension) and 0.5 inch respectively for an operating frequency of 26 megacycles.

The mode of application of the invention is illustrated schematically in Fig. 3. In this figure there are shown two electronic tubes 40 and 41 which are assumed to provide the final stage of power amplification of a high frequency radio transmitter desired to be tested as to its power output. For the sake of simplicity, the D.-C. connections for the tubes are omitted.

The plate electrodes 42 and 43 of the tubes 40 and 41 feed symmetrically (i. e. in push-pull relation) into a tuned circuit which is represented conventionally as comprising the combination of a condenser 45 and an inductance 46. The inductance 46 constitutes the primary of a transformer for coupling into an output circuit which includes the transformer secondary winding 47 and a tuning condenser 48.

In the normal use of the transmitter a connection would, of course, be made from the output circuit to a radiating antenna, but for the purpose of testing the transmitter prior to its being placed on the air, use is made of an energy dissipator of the type hereinbefore described. As illustrated in Fig. 3, this comprises a pair of concentric-conductor transmission line sections of which the outer conductors are indicated at 50 and 51. It is assumed that the inner conductors, whose terminals are shown at 53 and 54, extend concentrically within the conductors 50 and 51 and are terminally connected to these conductors in the manner illustrated in Fig. 1. The length of the conductors is chosen in accordance with the considerations stated above to cause each transmission line section to function as a quarter wave resonator or, alternatively, as an odd multiple quarter wave resonator. With the connections indicated the two sections are placed in series across the terminals of the transformer output circuit so that their total resistance is the sum of their individual resistances.

In accordance with the present invention, provisions are made for circulating a liquid of high dielectric constant, preferably water, through the hollow conductors 50 and 51. The source of such a liquid is illustrated diagrammatically as comprising a tank or reservoir 56 having a conduit 57 connecting it with inlet ducts 58 and 59 which are associated with the respective dissipator sections. After flowing through the dissipator the liquid is discharged through a conduit 60 which connects with outlet ducts 61 and 62.

In order to measure the energy dissipation of the load provided by the dissipator, a flow meter, indicated at 64 is provided to show the rate at which liquid is passing through the dissipator, and thermometers 66 and 67 are associated with the inlet and outlet conduits to indicate the temperature rise of the liquid within the dissipator. By knowing both the rate of water flow and the temperature rise, it is possible to compute directly the power input to the dissipator.

Where low temperature water (i. e. tap water) is used as a dielectric medium, it provides a very satisfactory means for disposing of the heat developed within the dissipator so that with a reasonable rate of water flow, a dissipator of small dimensions can handle a relatively large amount of power without excessive heating. As a matter of fact, in a practical case, a two-section dissipator having outer conductors each on the order of 12 inches in length and 2½ inches in diameter has been found capable of dissipating at least 50 kilowatts of power at a frequency of 26 megacycles.

It is not practical in all cases to provide a concentric line dissipator having a resistance which is precisely matched to the impedance of the output circuit of the transmitter desired to be tested. However, this difficulty may be readily overcome by connecting between the transmitter and the dissipator a known form of impedance transforming device such as on open-wire quarter wave transmission line of appropriate conductor dimensions and spacing. Such a line is indicated in Fig. 3 by conductors 70 and 71 which are interposed between the terminals of the output circuit 47—48 and the input terminals 53 and 54 of the energy dissipator.

While Fig. 3 illustrates the use of my improved dissipator in a symmetrical circuit and with the respective dissipator sections connected in series, it may be employed in various other ways, and in Fig. 4, I have shown its application in an asymmetrical circuit with its sections connected in parallel. In this embodiment the liquid circulating system is assumed to be used but is omitted from the drawings for purposes of simplicity.

In the arrangement of Fig. 4, as in that of Fig. 3, the final power amplifiers of a transmitting system are represented as three-electrode discharge devices 80 and 81. These feed through a parallel tuned circuit including a condenser 83 and an inductance 84 into a series-tuned output circuit which includes an inductance 85 and a condenser 86. In series with the latter circuit there is provided a two-section dissipator of which the outer conductors are illustrated at 88 and 89, the inner conductors being connected at their terminals by a bridging conductor indicated at 90. With this arrangement the two transmission line sections are obviously in parallel between their input terminals and ground. This connection will be used, of course, only where an especially low resistance load is required, as, for example, to facilitate matching to a low impedance output circuit.

It will be understood further that the applicability of the invention is not limited to a case in which the dissipation of energy is desired for test purposes only. For example, there is shown in Fig. 5 an arrangement in which a dissipator of the type in question is used as a fixed loading means for the input to an amplifying stage of a television transmitting circuit or the like in which wide-band transmission is desired.

The circuit shown comprises a pair of intermediate amplifiers 100 and 101 which connect through a multiple-tuned circuit with power amplifiers 103 and 104. In this arrangement the first stage of the tuned system comprises the combination of a condenser 105 and an inductance 106 connected directly to the plate terminals of the devices 100 and 101. The intermediate portion of the circuit includes a condenser 108 in parallel with a pair of inductances (e. g. transformer windings) 109 and 110, while the final component includes an inductance 112 in parallel with a condenser 113, the terminals of the latter element being directly connected to the grids 116 and 117 of the tubes 103 and 104. The plate electrodes 118 and 119 of the last-named tubes connect with a radiating antenna (not shown).

To produce the desired wide-band characteristic of the amplifier it is desirable to load the input circuit of the tubes 103 and 104, and in this connection, use may be made of a dissipator of the type which characterizes my invention. Such a dissipator is indicated at 120 as having its component sections connected in series between the grids 116 and 117. In this use, as in those previously described, it is assumed that an appropriate liquid such as water is circulated between the conductors of which the dissipator 120 is constituted.

In the various uses described in the foregoing the water-cooled quarter-wave dissipator exhibits the favorable properties of being highly stable in operation and substantially independent of the power being fed into it. Moreover, it effectively avoids the possibility of radiation, this latter advantage being especially important in the applications of Figs. 3 and 4. In both these latter cases, the fact that the outer conductors of the dissipator sections are solidly grounded obviously precludes radiation from these members, while the inner conductors are clearly effectively shielded as a result of being entirely enclosed.

A dissipator of the type described has a relatively broad resonance characteristic and may therefore be used over an appreciable range of frequencies. However, it may be desirable in some cases to provide even a greater degree of flexibility, and this may be done by an arrangement such as that shown in Fig. 6 in which provisions are made for varying the effective length of the dissipator illustrated.

In this case, the quarter wave resonant section comprises an outer conductor 130 and a hollow inner conductor 131 having apertures 132 at one end through which a liquid dielectric may be introduced into the space between the conductors, such liquid being appropriately supplied by a fluid-flow connection (not shown) to the lower extremity of the conductor 131. The liquid thus supplied is withdrawn through an outlet duct 134 provided in connection with the outer conductor 130. To confine the liquid between the conductors, there is provided an insulating plug 135 which seals the space between the inner and outer conductors at one end thereof. A corresponding seal is provided near the other end of the conductors by means of an annular ring 137 which is adapted to slide longitudinally of the conductors but which is enabled to provide a water-tight joint by the use of packing rings 140 and 141. These rings, which may be constituted of any suitable packing material, such as leather, bear tightly upon the conductors 130 and 131 but are adapted to permit longitudinal motion of the ring 137, such motion being produced, for example, by externally accessible actuating rods 144. In order that there may be a short-circuiting connection between the conductors 130 and 131 in the region of the plug 137, a metal ring 139 having inner and outer spring fingers 148 is secured to the plug. The wiping of the contact fingers of the ring 139 upon the surfaces of the conductors 130 and 131 assures the existence of a direct electrical connection between the conductors through the ring. Accordingly, by adjusting the plug 137 longitudinally of the conductors by means of the rods 144 the effective electrical length of the dissipator may be varied at will, and in this way the range of frequencies within which it may be used can be considerably extended.

The transmission line sections referred to in the foregoing have been described as embodying a concentric conductor construction since this has numerous advantages from the standpoint of simplicity of calculation and fabrication. However, the use of an eccentric conductor arrangement is by no means precluded, and the invention comprehends the use of any appropriate combination of mutually telescoped conductors. Under some circumstances, it may even be considered advantageous to use parallel conductors which are not in telescoped relation, although such a construction involves greater difficulty with respect to providing for the confined flow of fluid between the opposed surfaces of the conductors.

In the foregoing description and in the appended claims, the term "resonant" is intended to cover both series and parallel resonance and to apply to a dissipator in which the reactive components of the dissipator impedance are so balanced that the device simulates a pure resistance.

What I claim as new and desire to secure by Letters Patent of the United States, is:

1. A high frequency energy dissipator comprising a pair of conductors separated by a liquid of high dielectric constant and low resistivity, said conductors forming a transmission line section having an effective electrical length equal approximately to one or more quarter wavelengths at the frequency of said energy and being adapted for connection at one end to the source of the energy desired to be dissipated and being connected to one another at the opposite end.

2. A high frequency energy dissipator including a resonant transmission line section which comprises a pair of parallel spaced conductors, said conductors being adapted for connection at one end to the source of energy desired to be dissipated, means for connecting the conductors to one another at a point displaced from said one end, and means for facilitating substantial longitudinal circulation of liquid dielectric having a low resistivity in a confined path between the conductors, said conductors between said one end and said point having a length equal substantially to one or more quarter wavelengths at the frequency of said energy.

3. A high frequency energy dissipator comprising a resonant transmission line section which includes a pair of mutually telescoped conductors, said conductors being adapted for connection to the source of the energy desired to be dissipated to present a pure resistive load to said source, means forming a liquid-tight enclosure of the space between said conductors, and fluid-flow connections for facilitating substantial longitudinal circulation of a liquid dielectric having a low resistivity in the said space, said section having a length equal substantially to a multiple of a quarter wavelength at the frequency of said energy.

4. A high frequency energy dissipator for use at or near a particular frequency comprising a pair of mutually telescoped conductors, means forming a water-tight enclosure of the space between the conductors, terminal means for connecting the conductors at one end to the source of energy desired to be dissipated, and means short-circuitally connecting the opposite ends of the conductors, said conductors having an effective electrical length corresponding approximately to one or more quarter wave lengths at the said particular frequency when the space between them is filled with water.

5. A high frequency energy dissipator for use at or near a particular frequency comprising a pair of mutually telescoped conductors and fluid-flow connections for circulating a dielectric medium having a high dielectric constant and low resistivity between the said conductors, said conductors having an effective electrical length in the presence of said dielectric corresponding to one or more quarter wave lengths at the said particular frequency.

6. A high frequency energy dissipator comprising two similar structures each consisting of a pair of mutually telescoped conductors which are terminally short-circuited to provide a resonant transmission line section, said structures being mounted in side-by-side relation with their outer conductors directly connected so that the transmission line sections may be readily connected either in series or in parallel, and there being fluid-flow connections for facilitating circulation of liquid between the respective inner and outer conductors.

7. A high frequency energy dissipator comprising a first conductor of hollow configuration, a second conductor arranged within the first and forming with it a resonant transmission line section, an insulating plug occupying the space between the conductors near one end thereof, a plug slidably arranged between said conductors near the other end thereof and completing the enclosure of the space between the conductors, means associated with said second plug for short-circuiting said conductors at a point determined by the position of the plug, and fluid-flow connections for circulating a liquid dielectric in the interconductor space between said plugs.

8. In combination, a source of high frequency energy, and means for dissipating the said energy in the form of heat, said means comprising a pair of mutually spaced conductors and a liquid of relatively high dielectric constant and low resistivity in the space between the conductors, the electrical length of the conductors in the presence of said liquid being equal to one or more quarter wavelengths at the operating frequency to present a pure resistive load to said source.

9. In combination, a source of high frequency energy, and means for dissipating the said energy in the form of heat, said means comprising a pair of mutually telescoped conductors adapted to serve as a resonant transmission line section, and means for circulating water in the space between the conductors, said conductors having effective electrical lengths equal to a multiple of a quarter wavelength at the frequency of said energy whereby a pure resistive load is presented to said high frequency energy.

JAMES E. KEISTER.